US012046120B1

(12) United States Patent
Folsom et al.

(10) Patent No.: US 12,046,120 B1

(45) Date of Patent: Jul. 23, 2024

(54) ALARM SCORING BASED ON ALARM EVENT DATA IN A STORAGE ENVIRONMENT HAVING TIME-CONTROLLED ACCESS

(71) Applicant: The ADT Security Corporation, Boca Raton, FL (US)

(72) Inventors: Lawrence David Folsom, Las Vegas, NV (US); Thomas Nakatani, Aurora, CO (US); Susan Carie Small, Henderson, NV (US); Dmitry Vaynriber, Sunny Isles Beach, FL (US); Thomas Henry King, Lexington, SC (US); Mitchell Patrick Smith, Pompano Beach, FL (US); Jason Adukuzhiyil George, Missouri City, TX (US); Brooke Smith, Wake Forest, NC (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/428,917

(22) Filed: Jan. 31, 2024

(51) Int. Cl.

| | |
|---|---|
| ***G08B 25/00*** | (2006.01) |
| ***G07C 9/20*** | (2020.01) |
| ***G08B 13/22*** | (2006.01) |
| ***G08B 31/00*** | (2006.01) |

(52) U.S. Cl.

CPC ........... *G08B 25/006* (2013.01); *G07C 9/215* (2020.01); *G08B 13/22* (2013.01); *G08B 31/00* (2013.01)

(58) Field of Classification Search

CPC .................................................... G08B 25/006

See application file for complete search history.

(56) References Cited

U.S. PATENT DOCUMENTS

| | | | | |
|---|---|---|---|---|
| 9,390,228 | B2 | 7/2016 | Reid | |
| 9,973,484 | B2 | 5/2018 | Reid et al. | |
| 10,554,758 | B2 | 2/2020 | Barry et al. | |
| 10,650,652 | B1 * | 5/2020 | Weingart | G08B 13/22 |
| 11,100,777 | B2 | 8/2021 | Folsom | |
| 11,601,620 | B2 | 3/2023 | Nathan | |
| 2011/0267462 | A1 | 11/2011 | Cheng et al. | |

(Continued)

OTHER PUBLICATIONS

What is NG9-1-1?; IETF (Internet Engineering Task Force); Sep. 2008, consisting of 5-pages.

(Continued)

*Primary Examiner* — Travis R Hunnings

(74) *Attorney, Agent, or Firm* — Weisberg I.P. Law, P.A

(57) ABSTRACT

According to some embodiments, a system is provided. The system comprises a computing system that is configured to receive an alarm signal from a premises monitoring system that is configured to monitor a premises, receive alarm event data associated with an alarm event, store the alarm event data associated with the alarm event in at least one data store of the computing system, enforce an access control policy on the alarm event data stored in the at least one data store, the access control policy restricting access to the alarm event data based on time and a plurality of roles of a plurality of users of the computing system, perform at least one analytics operation on the alarm event data associated with the alarm event, and update a value of a current alarm score based on an output of the at least one analytics operation.

20 Claims, 10 Drawing Sheets

(56) References Cited

U.S. PATENT DOCUMENTS

| | | | | |
|---|---|---|---|---|
| 2012/0113265 | A1 | 5/2012 | Galvin et al. | |
| 2012/0170902 | A1 | 7/2012 | Zhu et al. | |
| 2013/0154822 | A1 | 6/2013 | Kumar et al. | |
| 2014/0063191 | A1* | 3/2014 | Bataller | G06V 40/172<br>340/541 |
| 2016/0335445 | A1 | 11/2016 | Stephens | |
| 2016/0364927 | A1 | 12/2016 | Barry et al. | |
| 2017/0263092 | A1* | 9/2017 | Rankin | G08B 13/22 |
| 2017/0351787 | A1* | 12/2017 | Kapuschat | G06Q 10/06312 |
| 2018/0113577 | A1 | 4/2018 | Burns et al. | |
| 2018/0341706 | A1 | 11/2018 | Agrawal et al. | |
| 2021/0012115 | A1* | 1/2021 | Bodbyl | G06V 20/176 |

OTHER PUBLICATIONS

UL 827 Standard for Safety Central-Station Alarm Services; ANSI; Oct. 29, 2014, consisting of 118-pages.

The Monitoring Association_Alarm Validation Scoring (AVS) Standard TMA AVS-01-2023 Revision 1; Jan. 2023, consisting of 31 pages.

* cited by examiner

ALARM SCORING BASED ON ALARM EVENT DATA IN A STORAGE ENVIRONMENT HAVING TIME-CONTROLLED ACCESS

TECHNICAL FIELD

The present disclosure is generally related to alarm scoring based on alarm event data in a storage environment having time-controlled access.

BACKGROUND

A variety of sensors or other premises devices may be deployed in a premises, each potentially placed in a distinct location or position depending on the specific requirements of the installation. Such sensors typically communicate wirelessly with one another and/or with one or more hubs and/or other control devices. These sensors may be deployed in diverse arrangements and different operational environments.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used to distinguish one entity or element from another entity or element without necessarily requiring or implying any physical or logical relationship or order between the entities or elements. The terminology used herein is only for the purpose of describing particular embodiments and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve electrical and data communication.

In some embodiments described herein, the term "coupled," "connected," and the like, may be used herein to indicate a connection, although not necessarily directly, and may include wired and/or wireless connections.

Figure 1:
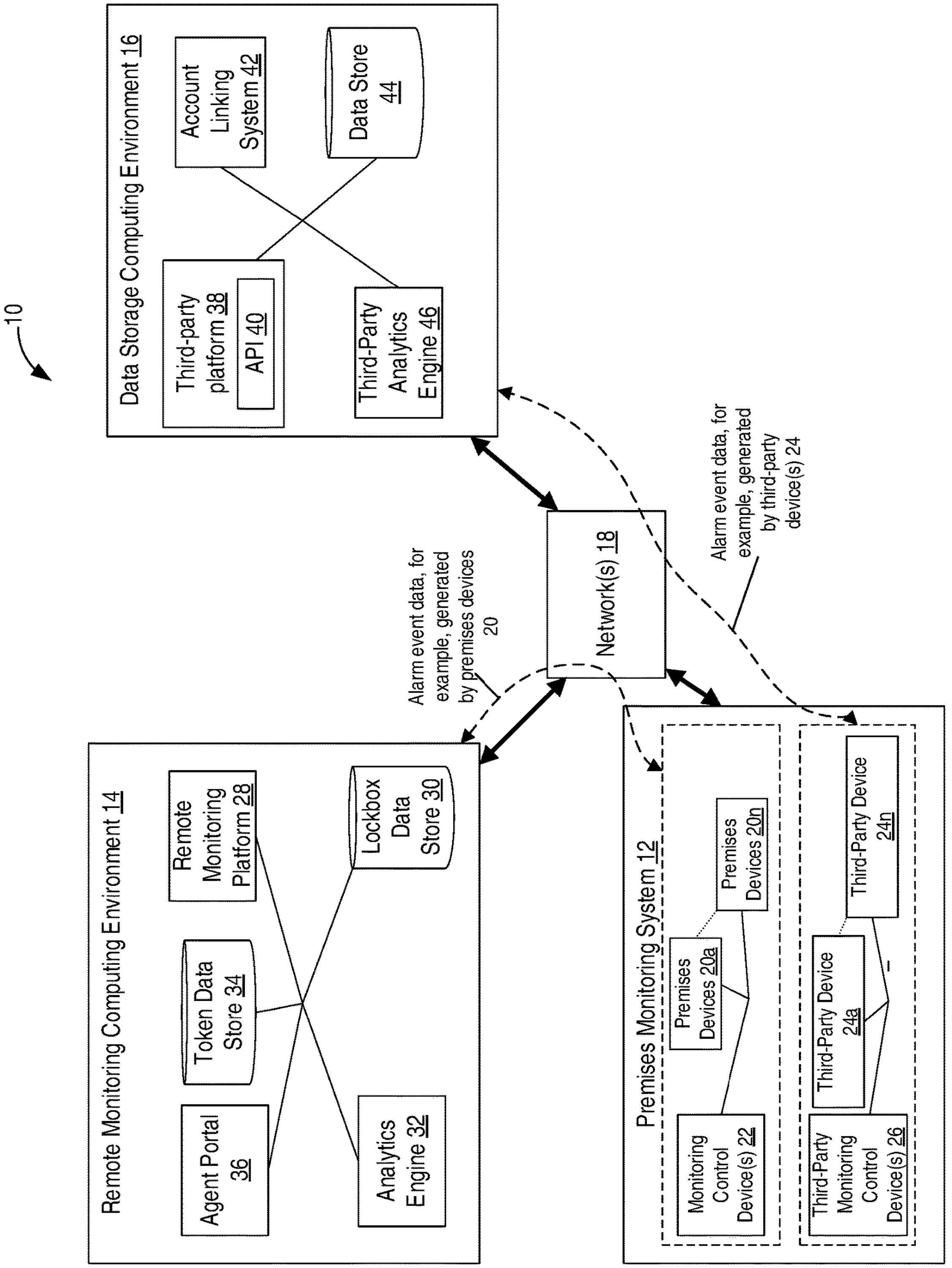
FIG. 1 is a block diagram of an example of a networked environment according to various embodiments of the present disclosure.

Referring now to the drawing figures, in which like elements are referred to by like reference numerals, there is shown in FIG. 1 is a block diagram of an example of a networked environment 10. Networked environment 10 includes premises monitoring system 12, remote monitoring computing environment 14 and data storage computing environment 16 in communication with each other via one or more networks 18 (collectively referred to as "network 18"). Data storage computing environment 16 may be referred to as data storage computing system. Premises monitoring system 12 comprises one or more premises devices 20*a*-20*n* (collectively referred to as "premises device 20") for monitoring a premises. According to various embodiments, the premises monitoring system 12 may be, for example, a burglary alarm system, an alarm system for monitoring the safety of life and/or property, a home automation system, and/or other types of systems for premises monitoring.

Premises devices 20 may include sensors, image capture devices, audio capture devices, life safety devices, premises automation devices, and/or other devices. For example, the types of sensors may include various life safety-related sensors, such as motion sensors, fire sensors, carbon monoxide sensors, flooding sensors, contact sensors, and other sensor types. Image capture devices may include still cameras and/or video cameras, among other image capture devices. Premises automation devices may include lighting devices, climate control devices, and other types of devices. Premises device 20 may be configured for sensing one or more aspects of premises, such as an open or closed door, open or closed window, motion, heat, smoke, gas, sounds, images, people, animals, objects, etc.

Monitoring control device 22 may be configured for controlling and/or managing the premises monitoring system 12 and/or premises devices 20. To this end, monitoring control device 22 may include components, such as a keypad, buttons, display screen, buzzer, and/or speaker, that may facilitate a user interacting with monitoring control device 22. In some embodiments, monitoring control device 22 may be an alarm system control panel, a keypad, or a home automation hub device. Additionally, a monitoring control device 22 in some embodiments may include a personal computer, smart phone, tablet computer, etc., with an application, such as a web browser or dedicated application, that facilitates controlling and/or managing the premises monitoring system 12 and/or premises devices 20. Monitoring control device 22 and premises devices 20 may communicate with each other using various protocols and network topologies. For example, monitoring control device 22 and premises devices 20 may wirelessly communicate using communications compliant with one or more versions of the Z-Wave protocol, Zigbee protocol, Wi-Fi protocol, Thread protocol, Bluetooth protocol, Digital Enhanced Cordless Telecommunications (DECT) protocol, and/or other protocols.

Monitoring control device 22 may be in communication with remote monitoring computing environment 14 via one or more networks 18. Network 18 can include, for example, one or more intranets, extranets, wide area networks (WANs), local area networks (LANs), wired networks, wireless networks, satellite networks, Data Over Cable Service Interface Specification (DOCSIS) networks, cellular networks, Plain Old Telephone Service (POTS) networks, and/or other types of networks.

One or more of the premises devices 20 in the premises monitoring system 12 can be third-party devices 24a-24n (collectively referred to as "third-party device 24") for monitoring a premises. One or more third-party devices 24 may be configured with the same or similar functions as premises devices 20, except that third-party devices 24 may be configured to communicate with third-party monitoring control device 26. Third-party monitoring control device 26 may be configured for controlling and/or managing the third-party devices 24 where, in one or more embodiments, third-party monitoring control device 26 and third-party devices 24 operate independent of monitoring control device 22 and premises device 20. Additionally, monitoring control device 22 may be configured to control and/or manage third-party devices 24 in various embodiments. Third-party monitoring control device 26 may be in communication with data storage computing environment 16 via one or more networks 18. Additionally, third-party devices 24 may be configured to communicate with devices through network 18 without the communications being routed through monitoring control device 22 or third-party monitoring control device 26.

In one example, the third-party device 24 may include a doorbell camera and/or video camera, and premises devices 20 may have various sensors and video cameras. In this example, monitoring control device 22 is configured to communicate data, such as media and/or alarm signal (e.g., event) information associated with premises device 20, to remote monitoring computing environment 14. Further, third-party device 24 is configured to communicate data, such as media and/or alarm signal information associated with third-party device 24, to data storage computing environment 16.

Still referring to FIG. 1, networked environment 10 includes remote monitoring computing environment 14 having remote monitoring platform 28, lockbox data store 30, analytics engine 32, token data store 34 and agent portal 36. Remote monitoring platform 28 may be configured to perform and/or trigger one or more functions and/or processes performed by remote monitoring computing environment 14, such as, for example, functions and/or processes associated with time-controlled access to alarm event data obtained from one or more third-party devices 24 where the time-controlled access may be based on the enforcement of access control policy on the alarm event data such as to, for example, restrict access to the alarm event data based on time and/or roles of users of remote monitoring computing environment 14, as described herein.

Lockbox data store 30 may be a secure data store that is configured for at least temporary storage of alarm event data for retrieval, management and/or analysis. In particular, lockbox data store 30 may be configured to at least temporarily store alarm event data associated with premises devices 20 and/or monitoring control device 22, and at least temporarily store alarm event data associated with third-party devices 24 and/or third-party monitoring control device 26, as described herein. The alarm event data stored in the lockbox data store 30 can include various types of data associated with premises monitoring systems 12. As examples, the alarm event data stored in the lockbox data store 30 can include, but is not limited to, video, such as video recordings obtained from one or more premises devices 20 or third-party devices 24; audio, such as audio recordings obtained from one or more premises devices 20 or third-party devices 24; weather data indicating the weather conditions at one or more premises at various times; building plans that represents the physical layout of one or more premises monitored by a premises monitoring system 12 and/or the remote monitoring computing environment 14; and/or other types of data. The alarm event data stored in the lockbox data store 30 can be generated by fixed devices, such as stationary surveillance cameras or other fixed devices, and/or mobile devices, such as smart phones, unmanned aerial vehicles, robotic devices, or other mobile devices. Various systems associated with the remote monitoring computing environment 14, such as the analytics engine 32 and/or other systems, can operate on alarm event data stored in the lockbox data store 30. According to various embodiments, the alarm event data stored in the lockbox data store 30 can be obtained from the data storage computing environment 16, premises devices 20, third-party devices 24, and/or other sources.

Analytics engine 32 may perform one or more analytic functions and/or processes on alarm event data (e.g., content, media and/or alarm event information) associated with premises monitoring system 12. For example, analytics engine 32 may be configured to perform one or more analytic functions and/or processes, such as object or activity detection, on alarm event data provided by premises devices 20, third-party devices 24, and/or the data storage computing environment 16. In some embodiments, the analytics engine 32 may perform one or more analytics operations on media, such as a video and/or audio recording, after receiving information regarding an output of the third-party analytics engine 46. For example, the analytics engine 32 may apply a person-detection analytic to a video after receiving metadata from the data storage computing environment 16 indicating that the third-party analytics engine 46 detected a person in the video. In this way, the analytics engine 32 can verify the result of the third-party analytics engine 46.

Token data store 34 is configured to store one or more access tokens that facilitate access to data and/or functionality provided by the data storage computing environment 16. In one or more embodiments, one or more customer access tokens may be generated by data storage computing environment 16 to provide time-controlled access to alarm event data stored in data store 44, as described herein.

Remote monitoring computing environment may also provide one or more agent portals 36 that may facilitate monitoring agents associated with remote monitoring computing environment 14 in initiating one or more remote monitoring actions. For example, in the event that the remote monitoring platform 28 receives an alarm signal from premises monitoring system 12, the agent portal 36 may render for display various information associated with the premises monitoring system 12 so that the monitoring agent may determine whether to alert a designated user of the premises monitoring system 12 and/or first responders, such as fire, ambulance, or police services. Agent portal 36 may also facilitate monitoring agents accessing and rendering alarm event data stored in data store 44 of data storage computing environment 16 in accordance with various access control policies.

Still referring to FIG. 1, data storage computing environment 16 may comprise a cloud data storage system. In various embodiments, data storage computing environment 16 comprises third-party platform 38 that is configured to perform one or more functions such as receiving requests, receiving alarm event data, triggering third-party analytics, causing storage of alarm event data generated by and/or obtained from third-party device 24, etc. Third-party platform 38 may include one or more application program interfaces (APIs 40) (collectively referred to as API 40) that are configured to, for example, facilitate communication with remote monitoring computing environment 14, third-party monitoring control device 26 and third-party device 24.

Account linking system 42 may provide various account linking functionality. For example, account linking system 42 may link a customer account associated with a particular premises monitoring system 12 to another customer account associated with the data storage computing environment 16. By linking the two accounts, the account linking system 42 may facilitate the remote monitoring computing environment 14 in obtaining data generated by third-party devices 24 in the premises monitoring system 12. In one example, remote monitoring computing environment 14 retrieves alarm event data and performs analytics on the alarm event data (e.g., content, media, etc.) stored in the data storage computing environment 16 as part of, for example, an alarm monitoring process to determine whether to trigger a premises monitoring system 12 action and/or remote monitoring computing environment 14 action. Therefore, in one or more embodiments, account linking system 42 may facilitate remote monitoring computing environment 14 using alarm event data generated by third-party devices 24 and/or third-party monitoring control devices 26 that would otherwise not be available to remote monitoring computing environment 14.

Data store 44 is configured to store alarm event data provided by third-party devices 24 and metadata associated with such alarm event data. For example, alarm event data generated by third-party device 24 may be received by data storage computing environment 16, analyzed by third-party analytics engine 46, and stored along with corresponding metadata in data store 44. The third-party analytics engine 46 may generate metadata associated with the alarm event data generated by and/or obtained from third-party device 24 where the metadata may indicate, for example, whether an object or activity was detected in alarm event data provided by third-party devices 24. In one or more embodiments, the metadata that is accessible by remote monitoring computing environment 14 may be predefined and recognizable by the remote monitoring computing environment 14. In other embodiments, object detection, activity detection, and/or other analytics may be performed by a premises device 20 or third-party device 24 using an on-device analytics engine. The premises device 20 and/or third-party device 24 can also provide the remote computing environment 14 and/or the data storage computing environment 16 with metadata indicating the results of the object detection, activity detection, and/or other analytics operations.

Figure 2:
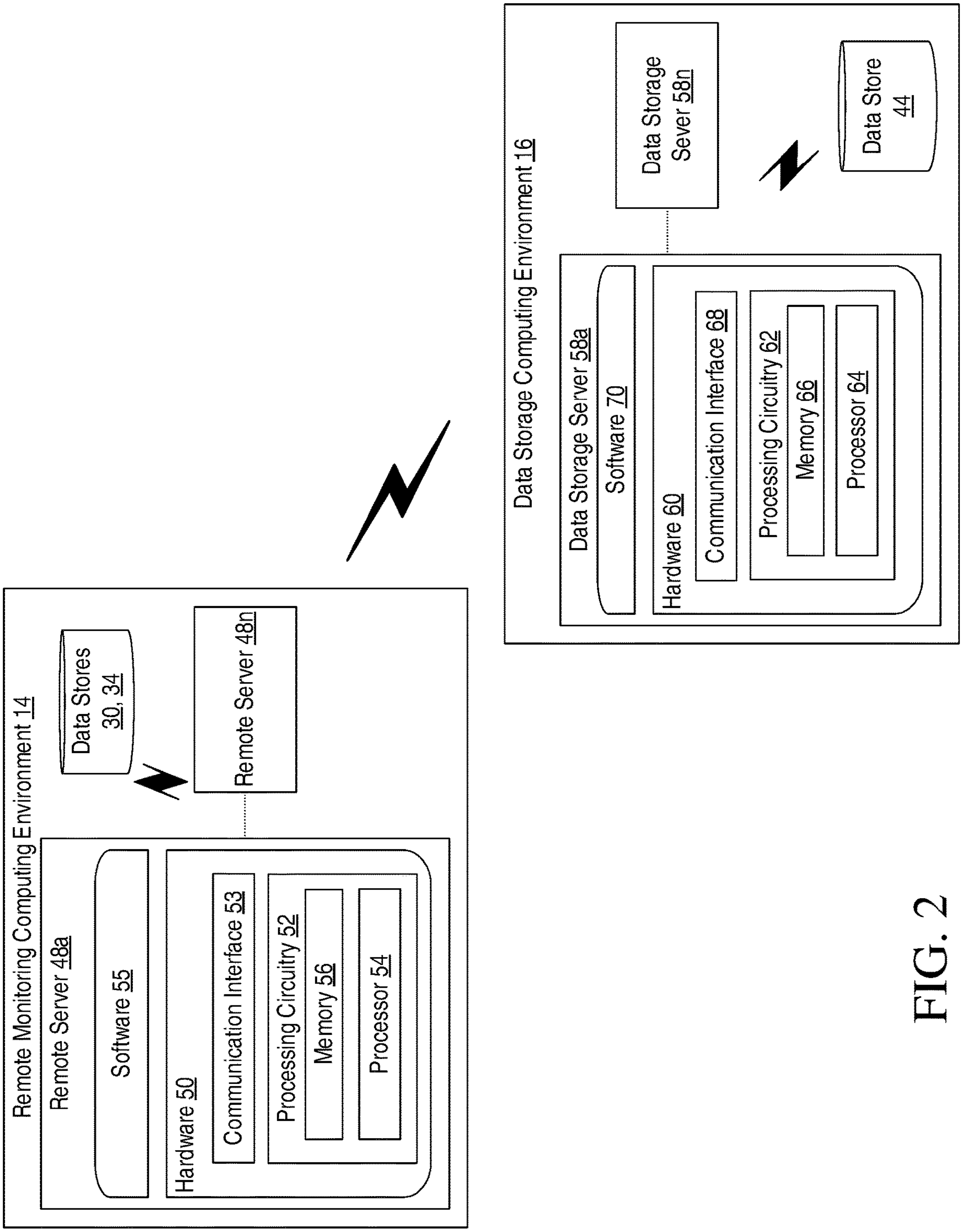
FIG. 2 is a block diagram of an example of the remote monitoring computing environment and the data storage computing environment of FIG. 1 according to various embodiments of the present disclosure.

Referring to FIG. 2, shown is a block diagram illustrating examples of various components of remote monitoring computing environment 14 and data storage computing environment 16. As shown, remote monitoring computing environment 14 may comprise one or more remote servers 48*a*-48*n* (collectively referred to as remote server 48) that are configured to perform one or more remote monitoring computing environment 14 functions that are described herein. For example, one or more functions of remote monitoring platform 28 may be performed in a single remote server 48 or may be distributed among two or more remote servers 48. Each remote server 48 comprises hardware 50. The hardware 50 may include processing circuitry 52. The processing circuitry 52 may include one or more processors 54 and one or more memories 56. Each processor 54 may include and/or be associated with one or more central processing units, data buses, buffers, and interfaces to facilitate operation. In addition to or instead of a processor 54 and memory, the processing circuitry 52 may comprise integrated circuitry for processing and/or control. Integrated circuitry may include one or more processors 54, processor cores, field programmable gate arrays (FPGAs), application specific integrated circuits (ASICs), graphics processing units (GPUs), Systems on Chips (SoCs), configured to execute instructions. The processor 54 may be configured to access (e.g., write to and/or read from) the memory 56, which may comprise any kind of volatile and/or nonvolatile memory, e.g., cache, buffer memory, random access memory (RAM), read-only memory (ROM), optical memory, and/or erasable programmable read-only memory (EPROM). Further, memory 56 may be configured as a storage device.

Hardware 50 of remote server 48 may include communication interface 53 enabling remote server 48 to communicate with one or more elements in networked environment 10. For example, communication interface 53 may be configured for establishing and maintaining at least a wireless or wired connection with one or more elements of premises monitoring system 12 and/or data storage computing environment 16. Further, communication interface 53 may be configured to establish and maintain at least a wireless or wired connection with data storage computing environment 16 such as with, for example, third-party platform 38 via API 40.

Remote server 48 further has software 55 (which may include one or more software applications) stored internally in, for example, memory 56, or stored in external memory (e.g., database, storage array, network storage devices, etc.) accessible by the remote server 48 via an external connection. Software 55 may include any software or program configured to perform the steps or processes of the present disclosure.

The processing circuitry 52 may be configured to control any of methods and/or processes described herein and/or to cause such methods, and/or processes to be performed, e.g., by remote server 48. Processor 54 corresponds to one or more processors 54 for performing remote server 48 functions described herein. The memory 56 is configured to store data and/or files, such as remote monitoring computing environment data and/or other information/data. In some embodiments, the software 55 may include instructions that, when executed by the processor 54 and/or processing circuitry 52, causes the processor 54 and/or processing circuitry 52 to perform the processes described herein with respect to remote server 48. Accordingly, by having computer instructions stored in memory 56 accessible to the processor 54, the processor 54 may be configured to perform the actions described herein.

Further, remote monitoring computing environment 14 may include a plurality of data stores, as described herein, such as, for example, lockbox data store 30 and token data store 34.

Still referring to FIG. 2, data storage computing environment 16 comprises one or more data storage servers 58*a*-58*n* (collectively referred to as data storage server 58) that are configured to perform one or more data storage computing environment 16 functions that are described herein. For example, one or more functions of third-party platform 38 may be performed in a single data storage server 58 or may be distributed among two or more data storage servers 58. Data storage server 58 comprises hardware 60. The hardware 60 may include processing circuitry 62. The processing circuitry 62 may include one or more processors 64 and one or more memories 66. Each processor 64 may include and/or be associated with one or more central processing units, data buses, buffers, and interfaces to facilitate operation. In addition to or instead of a processor 64 and memory, the processing circuitry 62 may comprise integrated circuitry for processing and/or control. Integrated circuitry may include one or more processors 64, processor cores, FPGAs, ASICs, GPUs, and/or SoCs configured to execute instructions. The processor 64 may be configured to access (e.g., write to and/or read from) the memory 66, which may comprise any kind of volatile and/or nonvolatile memory, e.g., cache, buffer memory, RAM, ROM, optical memory, and/or EPROM. Further, memory 66 may be configured as a storage device.

Hardware 60 of data storage server 58 may include communication interface 68 enabling data storage server 58 to communicate with one or more elements in networked environment 10. For example, communication interface 68 may be configured for establishing and maintaining at least a wireless or wired connection with one or more elements of premises monitoring system 12 and/or remote monitoring computing environment 14. Further, communication interface 68 may be configured to establish and maintain at least a wireless or wired connection with remote monitoring computing environment 14 such as with, for example, remote monitoring platform 28 via API 40.

Data storage server 58 further has software 70 (which may include one or more software applications) stored internally in, for example, memory 66, or stored in external memory (e.g., database, storage array, network storage device, etc.) accessible by the data storage server 58 via an external connection. Software 70 may include any software or program configured to perform the steps or processes of the present disclosure.

The processing circuitry 62 may be configured to control any of the methods and/or processes described herein and/or to cause such methods, and/or processes to be performed, e.g., by data storage server 58. Processor 64 corresponds to one or more processors 64 for performing data storage computing environment 16 functions described herein. The memory 66 is configured to store data and/or files such as data storage computing environment 16 data and/or other information/data. In some embodiments, the software 70 may include instructions that, when executed by the processor 64 and/or processing circuitry 62, cause the processor 64 and/or processing circuitry 62 to perform the processes described herein with respect to data storage server 58. Accordingly, by having computer instructions stored in memory 66 accessible to the processor 64, the processor 64 may be configured to perform the actions described herein.

Further, data storage computing environment 16 may include one or more data stores, as described herein, such as, for example, data store 44.

Figure 3:
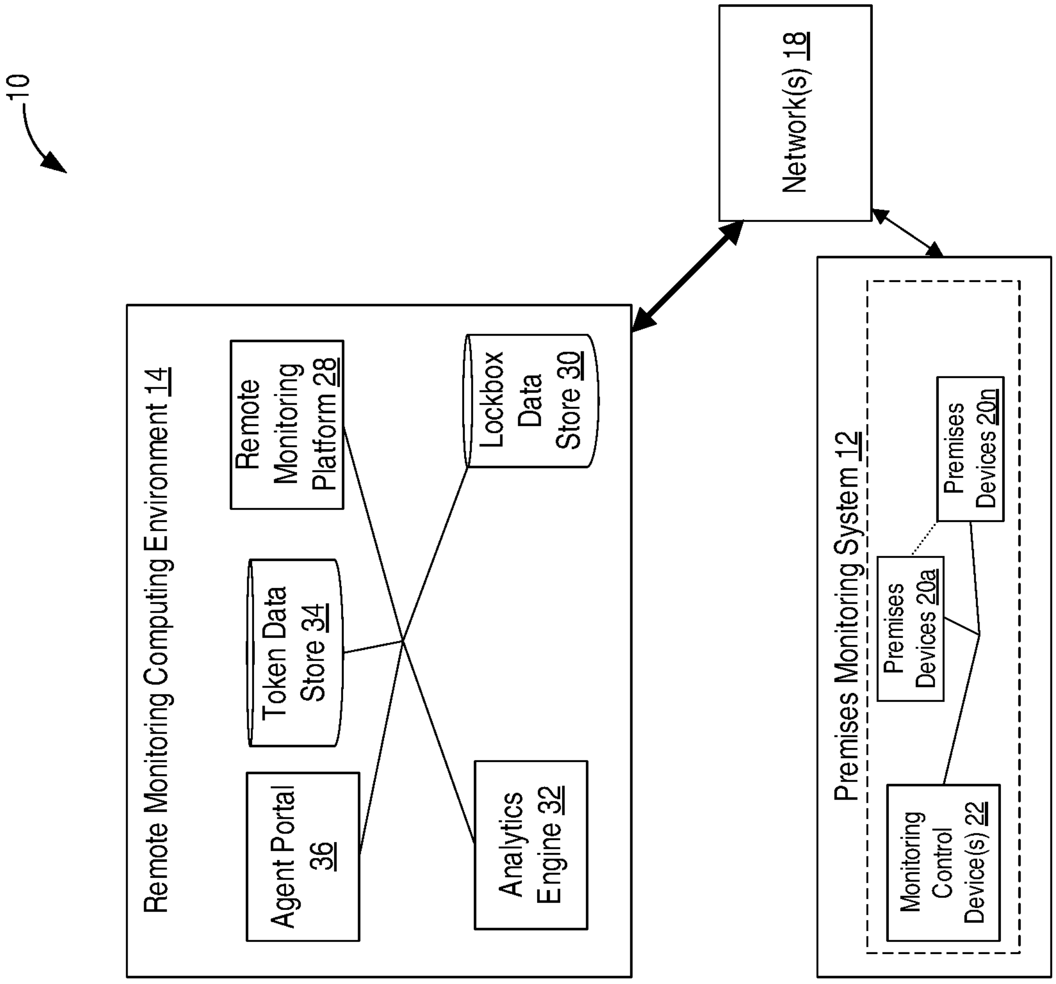
FIG. 3 is a block diagram of another example of a networked environment according to various embodiments of the present disclosure.

FIG. 3 is a diagram of another example of a networked environment 10, referred to herein as networked environment 10'. Networked environment 10' is similar to the networked environment 10 of FIG. 1, except the networked environment 10' does not include data storage computing environment 16, and storage the premises monitoring system 12 of networked environment 10' does not include third-party devices 24. In the example of FIG. 3, alarm event data generated by third-party devices 24 of premises monitoring system 12 is transmitted from premises monitoring system 12 to remote monitoring computing environment 14 via network(s) 18.

Figure 4A:
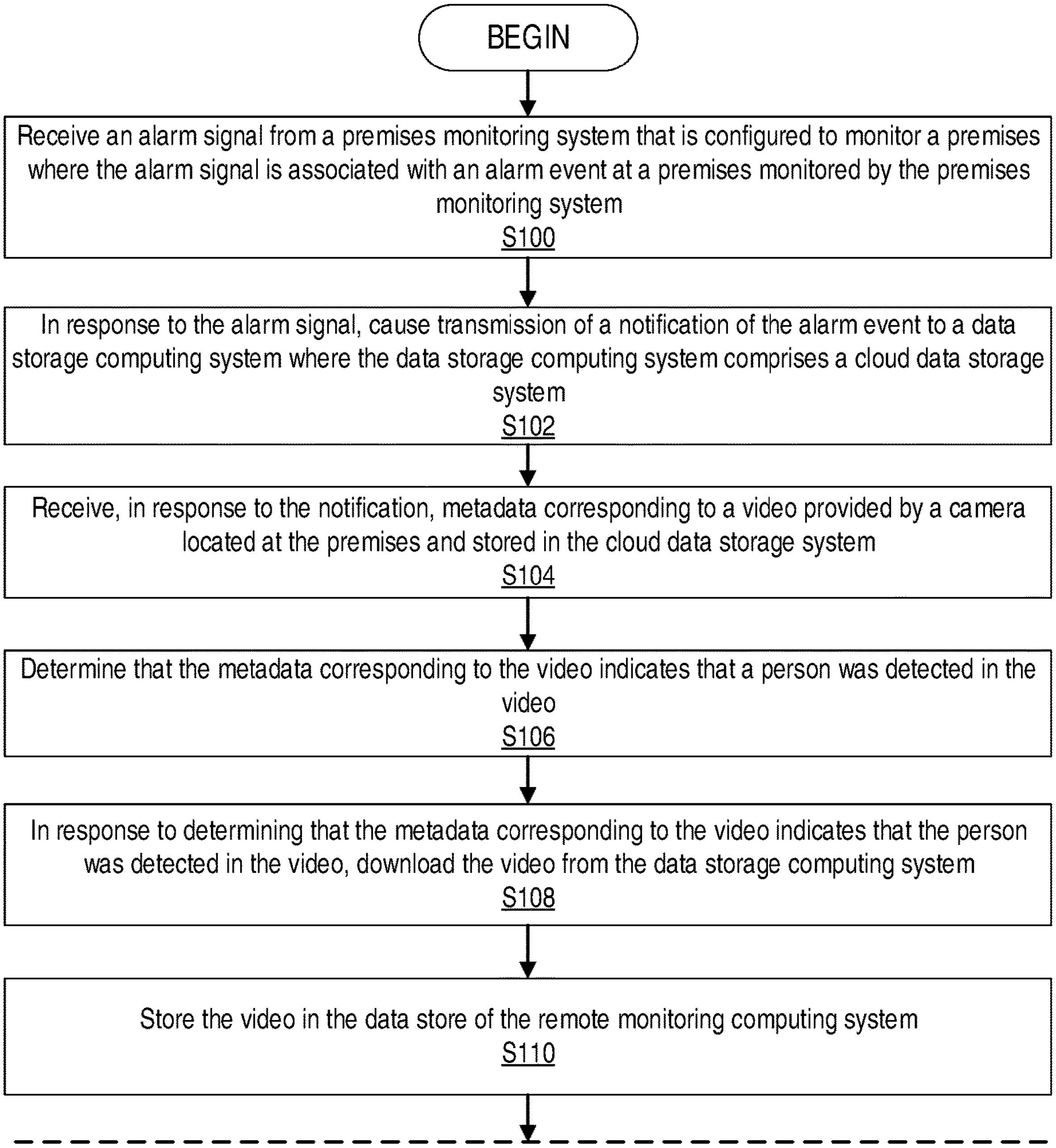
FIGS. 4A and 4B are a flowchart depicting an example of functionality performed by components in the remote monitoring computing environment 14 and/or data storage computing environment of FIG. 1 according to various embodiments of the present disclosure.
Figure 4B:
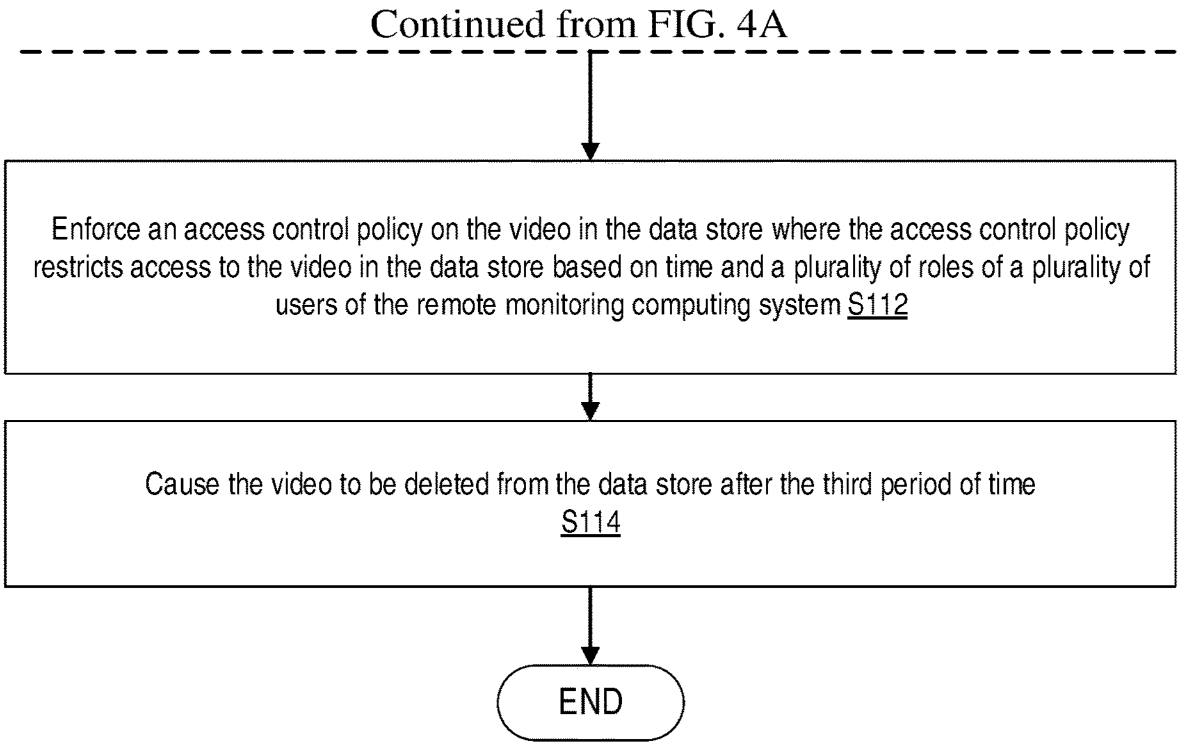

FIGS. 4A and 4B are a flow diagram of an example process performed by components of networked environment 10 according to one or more embodiments of the present disclosure. One or more blocks in FIGS. 4A-4B may be performed by remote monitoring computing environment 14, such as, for example, one or more of remote monitoring platform 28, lockbox data store 30, token data store 34, processing circuitry 52, processor 54, communication interface 53, etc. One or more blocks in FIG. 4A-4B may also be performed by data storage computing environment 16, such as, for example, third-party platform 38, data store 44, third-party analytics engine 46, processing circuitry 62, processor 64, communication interface 68, etc.

Beginning at Block S100, remote monitoring computing environment 14 (i.e., remote monitoring system) is configured to receive an alarm signal from a premises monitoring system 12 that is configured to monitor a premises where the alarm signal is associated with an alarm event at the premises, as described herein. Remote monitoring computing environment 14 is configured to, in response to the alarm signal, cause transmission of a notification of the alarm event to a data storage computing system 16, the data storage computing system 16 comprising a cloud data storage system, as described herein (Block S102). Remote monitoring computing environment 14 is configured to receive, in response to the notification, metadata corresponding to a video provided by a camera located at the premises and stored in the cloud data storage system, as described herein (Block S104). The video provided by the camera is one example of alarm event data. Remote monitoring computing environment 14 is configured to determine that the metadata corresponding to the video indicates that a person was detected in the video, as described herein (Block S106).

Remote monitoring computing environment 14 is configured to, in response to determining that the metadata corresponding to the video indicates that the person was detected in the video, download the video from the data storage computing environment 16, as described herein (Block S108). Remote monitoring computing environment 14 is configured to store the video in the data store of the remote monitoring computing system 14, as described herein (Block S110). Remote monitoring computing environment 14 is configured to enforce an access control policy on the video in the data store (e.g., lockbox data store 30) where the access control policy restricts access to the video in the data store based on time and a plurality of roles of a plurality of users of the remote monitoring computing system 14, as described herein (Block S112). In one or more embodiments, the access control policy comprises a first tier that permits a monitoring agent assigned to the alarm event to access the video for only a first period of time, a second tier that permits a supervisor of the monitoring agent to access the video for only a second period of time where the second period of time encompasses the first period of time and is longer than the first period of time, and a third tier that permits a designated administrator to access the video for only a third period of time where the third period of time encompasses the first period of time and the second period of time, and where the third period of time is longer than the first period of time and the second period of time. Remote monitoring computing environment 14 is configured to cause the video to be deleted from the data store after the third period of time, as described herein (Block S114).

According to one or more, remote monitoring computing environment 14 is configured to cause transmission of a notification of the alarm event to the data storage computing environment 16, and receive, in response to the notification, the metadata corresponding to the video.

According to one or more embodiments, data storage computing environment 16 is configured to provide data storage service for a plurality of data storage service customers.

According to one or more embodiments, remote monitoring computing environment 14 is configured to obtain, from the data storage computing environment 16, an access token that facilitates obtaining alarm event data stored in the data storage computing environment 16.

Figure 5A:
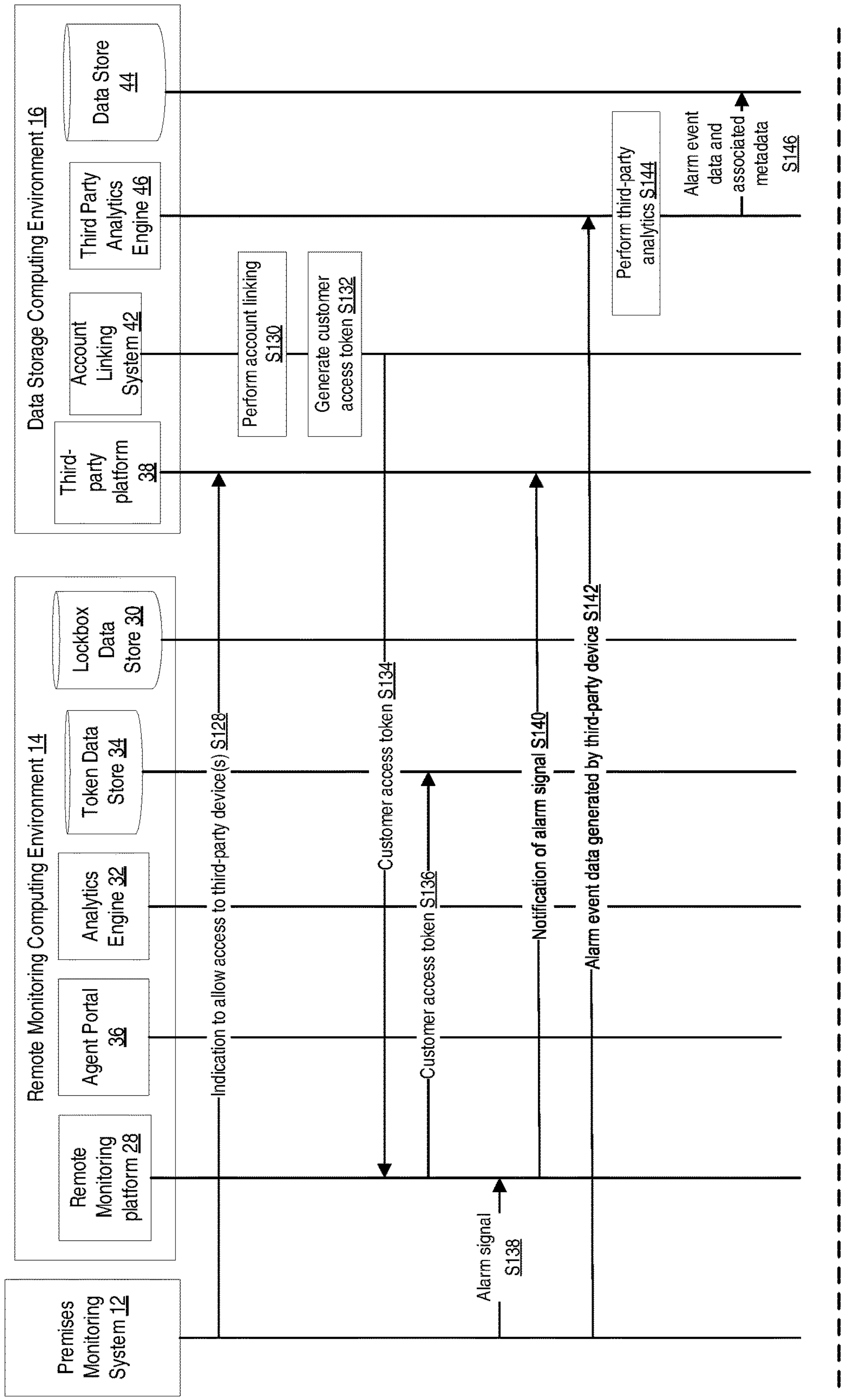
FIGS. 5A and 5B are a sequence diagram depicting an example of functionality performed by components in the premises monitoring system, remote monitoring computing environment and data storage computing environment of FIG. 1 according to various embodiments of the present disclosure.
Figure 5B:
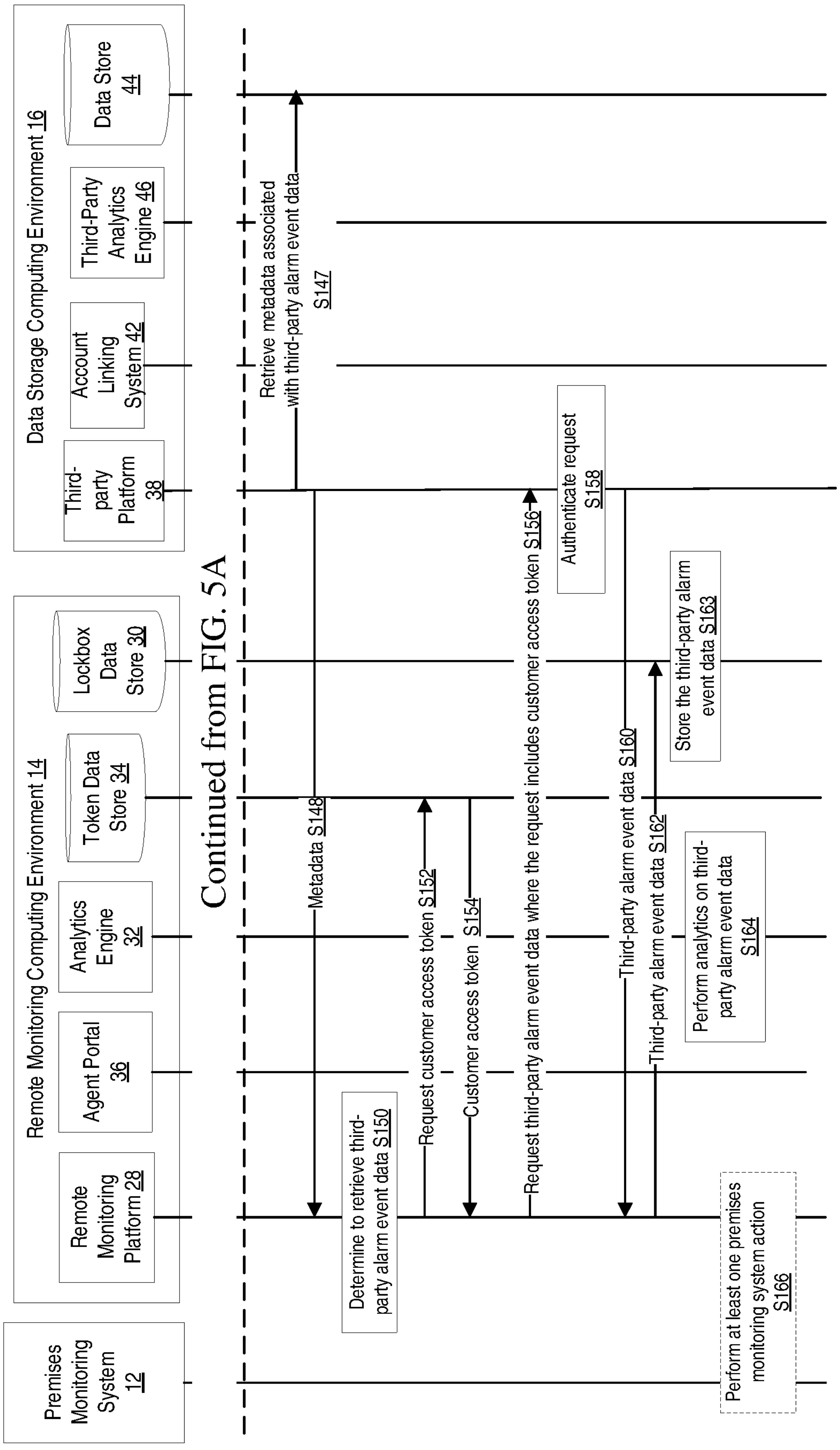

FIGS. 5A and 5B are a signal diagram of an example process according to some embodiments of the present disclosure. Beginning at Step S128, premises monitoring system 12 transmits an indication to allow third-party access to third-party devices 24 (Step S128). For example, a user associated with premises monitoring system 12 may indicate to premises monitoring system 12, such as via a security control panel, that the user wants to give remote monitoring computing environment 14 access to alarm event data generated by and/or obtained from third-party device 24 that is otherwise not accessible by remote monitoring computing environment 14. That is, third-party monitoring control device 26, third-party device 24 and data storage computing environment 16 are separate and independent from monitoring control device 22, premises device 20 and remote monitoring computing environment 14. However, the user wants to take advantage of the account linking described herein in order to allow remote monitoring computing environment 14 to access alarm event data generated by third-party device 24, which may help provide more accurate monitoring, alarm determinations and/or alarm actions. Hence, the user initiates accounting linking between remote monitoring computing environment 14 and one or more data storage computing environments 16 associated with one or more third-party devices 24.

In one or more embodiments, the indication indicates one or more of the third-party devices 24 the user wants to link with remote monitoring computing environment 14. For example, the user may link one or a subset of the third-party devices 24. Further, the user may indicate how the third-party devices 24 can be used by remote monitoring computing environment 14 such as, for example, alarm event data from the third-party devices 24 can be used for monitoring the premises or only after an alarm signal associated with an alarm event has been triggered using alarm event data from premises devices 20.

Data storage computing environment 16, via account linking system 42, performs account linking (Step S130). For example, data storage computing environment 16 may identify the account associated with the request and authentication the request. Data storage computing environment 16 is configured to generate a customer access token (Step S132). For example, data storage computing environment 16 may generate a customer access token that is usable, by remote monitoring computing environment 14, to access alarm event data generated by third-party device 24 in the future. Data storage computing environment 16 is configured to transmit the customer access token to remote monitoring platform 28 of remote monitoring computing environment 14 (Step S134). The transmission of the customer access token may indicate or include an indication that the request of step S128 has been granted and/or access to a subset of the third-party devices 24 indicated in the request has been granted. Remote monitoring platform 28 causes the customer access token to be stored in token data store 34 (Step S136). For example, remote monitoring computing environment 14 may store the customer access token for use during monitoring and/or alarm event determination.

Premises monitoring system 12 is configured to generate and transmit an alarm signal to remote monitoring platform 28 (Step S138). For example, monitoring control device 22 generates an alarm signal associated with an alarm event based on alarm event data received from one or more premises devices 20. In one or more embodiments, the alarm event determination and/or alarm signal generation is not based on alarm event data obtained from third-party device 24. In one or more embodiments, remote monitoring platform 28 determines whether the user and/or premises monitoring system 12 associated with the alarm signal is enrolled in account linking services. If enrolled, the process proceeds to step S140. If not enrolled, remote monitoring computing environment 14 may determine whether to perform at least one premises monitoring system 12 action without the use of alarm event data generated by third-party device 24.

Remote monitoring platform 28 is configured to transmit a notification of the alarm signal to third-party platform 38 (Step S140). In particular, the notification of the alarm signal may correspond to and/or include a request for alarm event data generated by third-party device 24 where the notification includes the customer access token to allow authentication of the notification. That is, remote monitoring platform 28 may determine to investigate the alarm signal using additional alarm event data generated by and/or obtained from third-party device 24 (if such alarm event data exists and is accessible) such that remote monitoring platform 28 retrieves the customer access token from token data store 34 and transmits the customer access token along with the notification, thereby allowing third-party platform 38 to authenticate the notification using, for example, the customer access token.

Premises monitoring system 12 (e.g., third-party monitoring control device 26 and/or third-party device 24) are configured to transmit alarm event data generated by third-party device 24 to data storage computing environment 16 (e.g., third-party analytics) (Step S142). For example, third-party monitoring control device 26 may transmit alarm event data in response to a third-party device 24 generating the alarm event data and/or in response to the triggering of an alarm signal associated with third-party monitoring control device 26 and/or third-party device 24. Third-party analytics engine 46 is configured to perform analytics on the alarm event data generated by third-party device 24 (Step S144). For example, third-party analytics engine 46 may perform video and/or audio analytics on alarm event data generated by third-party device 24 such as to, for example, perform objection detection or some other detection that is indicative of an alarm event. Further, third-party analytics engine 46 may be configured to generate metadata associated with the alarm event data generated by third-party device 24. For example, the metadata may indicate whether an object was detected or may indicate a type of alarm (e.g., smoke alarm, intrusion alarm, etc.). Data storage computing environment 16 is configured to store the alarm event data generated by third-party device 24 and associated metadata in data store 44 (Step S146). In one or more embodiments, the alarm event data generated by third-party device 24 and metadata are tagged and/or associated with the user of premises monitoring system 12. While steps S142-S146 are shown as occurring after Block S138 and S140, in one or more embodiments, one or more of steps S142-S146 may occur before or during Blocks S138 and S140 as the alarm event data generated by third-party device 24 may be associated with an alarm signal generated by third-party monitoring control device 26 and/or may be generated during the alarm event detected by monitoring control device 22.

Referring to FIG. 5B, third-party platform 38 is configured to retrieve metadata associated with alarm event data generated by third-party device 24 that is associated with the notification of alarm signal in step S140. For example, in response to the notification of the alarm signal, third-party platform 38 may search data store 44 for alarm event data generated by third-party device 24 that is time-stamped a predefined amount of time before the alarm event, time-stamped during the alarm event and/or time-stamped a predefined amount of time after the alarm event, in which third-party platform 38 may retrieve metadata from data store 44 (Step S147).

Third-party platform 38 such as via API 40 is configured to transmit the metadata to remote monitoring platform 28 (Step S148). For example, in response to the notification of alarm event at step S140, data storage computing environment 16 is configured to transmit metadata associated with alarm event data generated by and/or obtained from third-party device 24 of premises monitoring system 12. Remote monitoring platform 28 is configured to determine whether to retrieve (e.g., download) the alarm event data generated by and/or obtained from third-party device 24 and associated with the metadata of step S148 based at least on the metadata (Step S150). For example, remote monitoring platform 28 may determine that the metadata indicates an object was detected in alarm event data generated by third-party device 24 during the alarm event such that remote monitoring platform 28 determines to retrieve the alarm event data generated by third-party device 24 associated with the metadata.

Remote monitoring platform 28, in response to determining to retrieve alarm event data generated by third-party device 24, is configured to request customer access token from token data store (Step S152). Remote monitoring platform 28 is configured to receive the customer access token from token data store (Step S154). Remote monitoring platform 28 is configured to request alarm event data generated by third-party device 24 and associated with the metadata from data storage computing environment 16 (Step S156). In one or more embodiments, the request in step S156 includes the customer access token that is usable by data storage computing environment 16 to authenticate the request for alarm event data generated by and/or obtained from third-party device 24. Third-party platform authenticates the request (Step S158) such as by, for example, verifying that customer access token in the request corresponds to the token generated in step S132.

Third-party platform 38 is configured to, in response to authenticating the request in step S158, transmit the alarm event data generated by and/or obtained from third-party device 24 or one or more links (e.g., Uniform Resource Locator(s) (URL(s))) to download the alarm event data to remote monitoring platform 28 (Step S160). In one or more embodiments, data storage computing environment 16 may be configured to send notifications of newly generated alarm event data (i.e., alarm event data generated by third-party device 24) that may be associated with the alarm signal. In one or more embodiments, the alarm event data generated by and/or obtained from third-party device 24 may include alarm event data from up to a predefined amount of time before the alarm signal (e.g., three minutes).

Once the alarm event data generated by and/or obtained from third-party device 24 is received by remote monitoring platform 28, remote monitoring platform 28 causes the alarm event data to be stored in lockbox data store 30 such that remote monitoring platform 28 has time-controlled access to the alarm event data (Steps S162-S163). For example, lockbox data store 30 may be configured to allow limited access to the alarm event data generated by and/or obtained from third-party device 24 for one or more predefined amounts of times. In one or more embodiments, the alarm event data generated by and/or obtained from third-party device 24 is automatically deleted from lockbox data store 30 after a predefined amount of time, e.g., 13 months. Further, lockbox data store 30 may allow access to the alarm event data generated by and/or obtained from third-party device 24 according to one or more rules and/or access control policies. Some example rules and/or access control policies include one or more of the following:

a first tier where a monitoring agent associated with remote monitoring computing environment 14 and/or assigned to the alarm event is allowed access, via agent portal 36, to the alarm event data generated by and/or obtained from third-party device 24 for up to a predefined amount of time or first period of time (e.g., three hours) after initiation of the alarm event;

a second tier where supervisor of the monitoring agent is allowed access, via agent portal 36, to the alarm event data generated by and/or obtained from third-party device 24 for a predefined amount of time or second period of time, e.g., up to thirty days after initiation of the alarm event, where the second period to time may encompass the first period to time and/or is longer than the first period to time a third tier where a designated administrator (e.g., legal representative) associated with remote monitoring computing environment 14 is allowed access, via agent portal 36, to the alarm event data generated by and/or obtained from third-party device 24 for a predefined amount of time or third period of time, e.g., any time until the alarm event data is automatically deleted, where the third period of time may encompass the first period of time and second period of time and/or be longer than the first period of time and second period of time.

In one or more embodiments, data storage computing environment 16 may keep track of the alarm event data generated by and/or obtained from third-party device 24 that has been accessed by remote monitoring computing environment 14 such that the user is able to manually verify which of the alarm event data has been accessed by remote monitoring computing environment 14.

Analytics engine 32 of remote monitoring platform 28 is configured to perform analytics on alarm event data generated by and/or obtained from third-party device 24 (Step S164). For example, analytics engine 32 may correspond to video and/or audio analytics, among other types of analytics that may be used to indicate an alarm condition. Remote monitoring platform 28 is configured to perform at least one premises monitoring system 12 action based at least on analytics engine 32 (Step S166).

Further, in various embodiments, remote monitoring computing environment 14 is configured to determine and/or update an alarm level assigned to an alarm event based on alarm event data received and/or added to lockbox data store 30. In various embodiments, an alarm event can be assigned an initial alarm level (e.g., "1" in accordance with The Monitoring Association (TMA) alarm validation scoring (AVS)-01-2023 standard ("AVS-01")) upon receipt of an initial alarm signal at the remote monitoring computing environment 14. For example, an alarm event may be automatically designated as being a level 1 alarm event when an alarm signal is received by the remote monitoring computing environment 14. The alarm level can be escalated or de-escalated as additional information becomes available to remote monitoring computing environment 14.

Various example alarm levels follow. Alarm level 0 may correspond to an intrusion alarm event where it is determined that requesting assistance from first responders is not warranted. Alarm level 1 may be the default level for an intrusion alarm and indicate that additional information that may result in the alarm level being escalated or de-escalated is not available. Alarm level 2 may correspond to a level where there is alarm event data indicative of a human present in the premises and that his or her intent is unknown. Remote monitoring platform 28 may determine that an alarm event is a level 2 event in response to, for example, analytics engine 32 detecting a person depicted in surveillance video from the premises. Alarm level 3 may correspond to a level where there is alarm event data indicative of a human present in the premises and that the alarm event data further indicates that there is a threat to property. Remote monitoring platform 28 may determine that an alarm event is a level 3 event in response to, for example, analytics engine 32 detecting a person breaking objects in surveillance video from the premises. Alarm level 4 may correspond to a level where the alarm event data indicates that human is present at the premises and the alarm event data further indicates that there is a threat to life. Remote monitoring platform 28 may determine that an alarm event is a level 4 event in response to, for example, analytics engine 32 detecting that speech in audio data indicates that a person stated the phrase "I'm going to kill you."

As the alarm event progresses, alarm event data (e.g., video, audio, motion sensor data, and/or other information) can be received at remote monitoring computing environment 14 and stored in lockbox data store 30. When data (e.g., associated with alarm event and/or premises) has been added to lockbox data store 30, analytics engine 32 can process the alarm event data to determine whether to escalate or de-escalate the alarm level (e.g., value of the alarm score). For example, if a person is detected in video (i.e., one example of alarm event data) by analytics engine 32, the alarm level can be increased to "2" (indicating that human activity was detected, in accordance with, for example, AVS-01). If information, such as sensor data, is received by remote monitoring computing environment 14 indicating that a glass break sensor (e.g., premises device 20) has been triggered, the alarm level can be increased to "3" (indicating that a threat to property has been detected). If data (e.g., audio data from premises monitoring system 12) is received and a gunshot is detected by analytics engine 32, the alarm level can be increased to "4" indicating that a threat to human life was detected, in accordance with, for example, AVS-01). The process of analyzing data associated with the alarm event that is stored in lockbox data store 30 may occur, for example, in response to receiving the alarm event data and/or periodically (e.g., based on a timer) and/or manually triggered by a user, and the updating of the alarm level (e.g., value of the current alarm score) can continue until the alarm event has concluded. The example numerical designations for alarm levels provided herein are solely for purposes of understanding the present disclosure and are not intended to be limiting. Other classifications, such as alphabetic or alphanumeric classifications, can be used. Similarly, instead of higher numbers corresponding to higher levels of alarm severity, the order can be reversed such that lower numbers correspond to higher levels of alarm severity.

In accordance with various embodiments, data associated with an alarm event is received by remote monitoring computing environment 14 and stored in lockbox data store 30. The alarm event data is input to one or more analytics engines 32 that perform video, image, audio, and/or other types of analytics operations to determine whether to adjust the alarm level assigned to the event.

Figure 6:
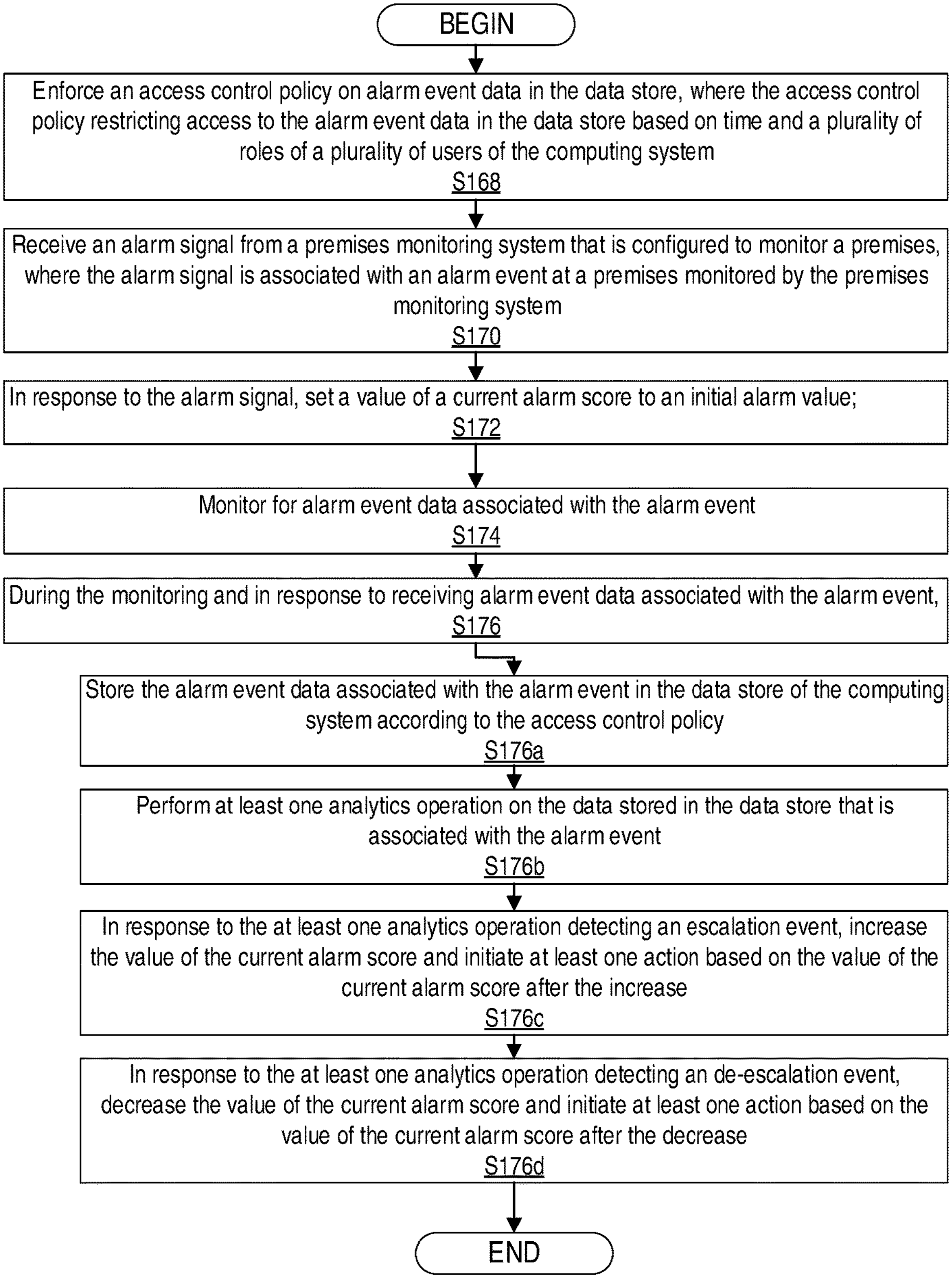
FIG. 6 is a flowchart depicting an example of functionality performed by components in the remote monitoring computing environment of FIG. 1 according to various embodiments of the present disclosure.

FIG. 6 is an example flowchart depicting an example of functionality performed by components in the remote monitoring computing environment 14 of FIG. 1 according to various embodiments of the present disclosure. Beginning at Block S168, remote monitoring computing environment 14 is configured to enforce (Block S168) an access control policy on alarm event data in the data store 30, where the access control policy restricts access to the alarm event data in the data store 30 based on time and a plurality of roles of a plurality of users of the remote monitoring computing system 14, as described herein. Remote monitoring computing environment 14 is configured to receive (Block S170) an alarm signal from a premises monitoring system 12 that is configured to monitor a premises, where the alarm signal is associated with an alarm event at a premises monitored by the premises monitoring system 12, as described herein.

Remote monitoring computing environment 14 is configured to, in response to the alarm signal, set (Block S172) a value of a current alarm score to an initial alarm value, as described herein. For example, the initial alarm value may correspond to a default alarm value. Remote monitoring computing environment 14 is configured to monitor for alarm event data associated with the alarm event, as described herein (Block S174). During the monitoring and in response to receiving alarm event data associated with the alarm event, store (Block S176*a*) the alarm event data associated with the alarm event in the data store of the computing system according to the access control policy, and perform (Block S176*b*) at least one analytics operation on the alarm event data stored in the data store that is associated with the alarm event. During the monitoring and in response to receiving alarm event data associated with the alarm event, the remote monitoring computing environment 14 is configured to, in response to the at least one analytics operation detecting an escalation event, increase the value of the current alarm score and initiate at least one action based on the value of the current alarm score after the increase, as described herein (Block S176*c*). For example, the at least one action performed by remote monitoring computing environment 14 includes performing communications (e.g., making a call or via electronic message) to first responders, and informing the first responders about a change to the alarm score. During the monitoring and in response to receiving alarm event data associated with the alarm event, the remote monitoring computing environment 14 is configured to, in response to the at least one analytics operation detecting a de-escalation event, decrease the value of the current alarm score and initiate at least one action based on the value of the current alarm score after the decrease, as described herein (Block S176*d*). According to one or more embodiments, one or more of Blocks S174-S176 may be performed while the alarm event is active.

According to one or more embodiments, the alarm event data associated with the alarm event comprises at least one of video content, user-generated information, remote monitoring system information or audio content.

According to one or more embodiments, the at least one action comprises causing transmission, to a first responder system, of a notification that comprises the value of the current alarm score.

According to one or more embodiments, the at least one action comprises causing transmission, to a mobile device corresponding to an authorized user of the premises monitoring system, of a notification associated with the alarm event.

According to one or more embodiments, the access control policy comprises a first tier that permits a monitoring agent assigned to an alarm event to access the alarm event data for only a first period of time, a second tier that permits a supervisor of the monitoring agent to access the alarm event data for only a second period of time, where the second period of time encompasses the first period of time and is longer than the first period of time, and a third tier that permits a designated administrator to access the alarm event data for only a third period of time, where the third period of time encompasses the first period of time and the second period of time, and where the third period of time is longer than the first period of time and the second period of time.

According to one or more embodiments, the at least one action comprises adjusting the access control policy for the alarm event data.

According to one or more embodiments, the plurality of instructions are further configured to cause, in response to the alarm signal being received from the premises monitoring system 12, the value of the current alarm score to be to set to a default alarm value.

According to one or more embodiments, the plurality of instructions are further configured to cause the at least one processor 54 to determine that the output of the at least one analytics operation indicates an escalation event at the premises, and update of the value of the current alarm score by at least escalating the value of the current alarm score based on the escalation event.

According to one or more embodiments, the escalation event comprises at least one of: a person present at the premises, a threat to property at the premises, or a threat to life at the premises.

According to one or more embodiments, the plurality of instructions are further configured to cause the at least one processor 54 to: determine that the output of the at least one analytics operation indicates a de-escalation event at the premises, and update the value of the current alarm score by at least de-escalating the value of the current alarm score based on the de-escalation event.

According to one or more embodiments, the de-escalation event comprises an authorized person being present at the premises.

Figure 7A:
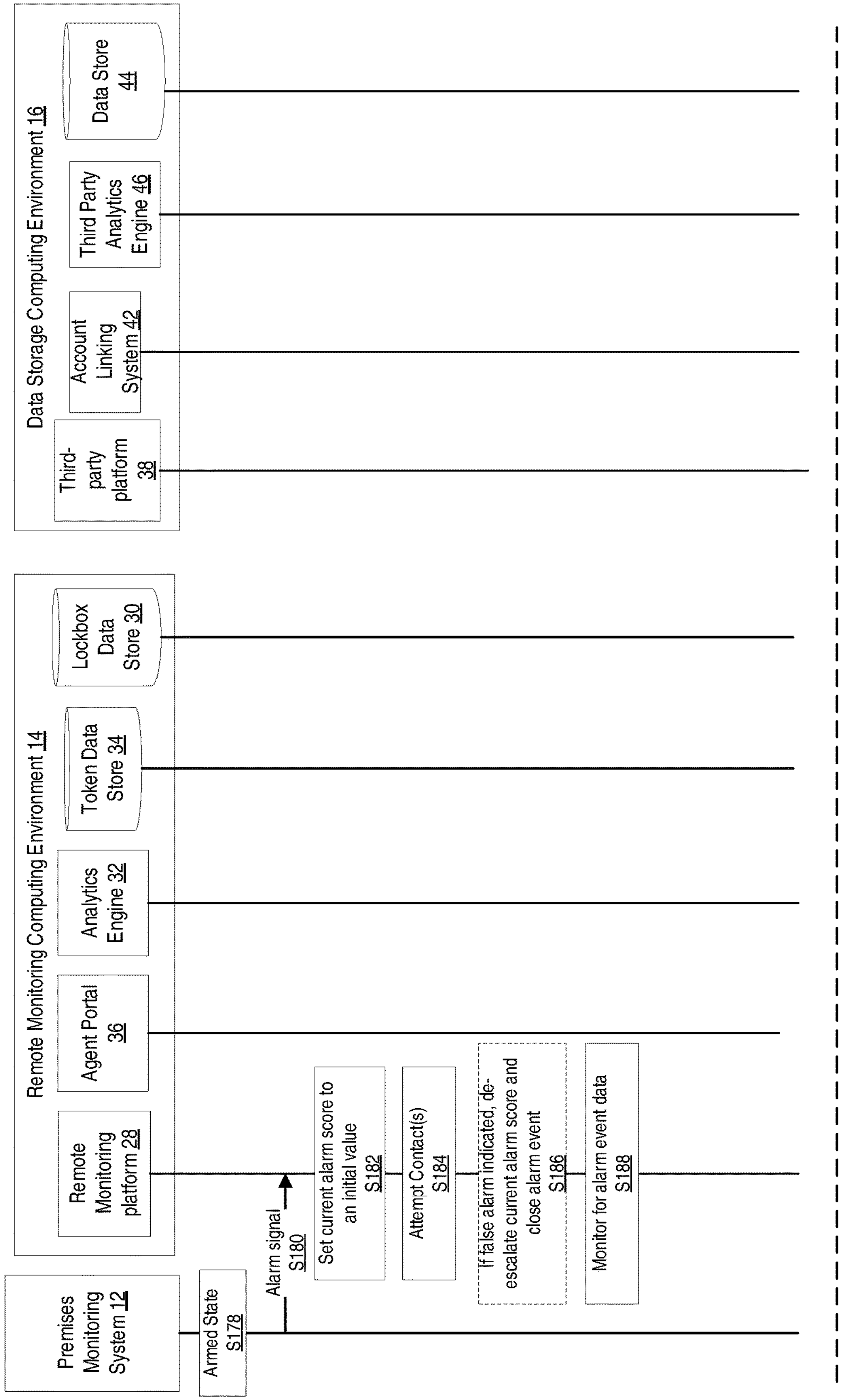
FIGS. 7A and 7B are a sequence diagram depicting another example of functionality performed by components in the premises monitoring system, remote monitoring computing environment and data storage computing environment of FIG. 1 according to various embodiments of the present disclosure.
Figure 7B:
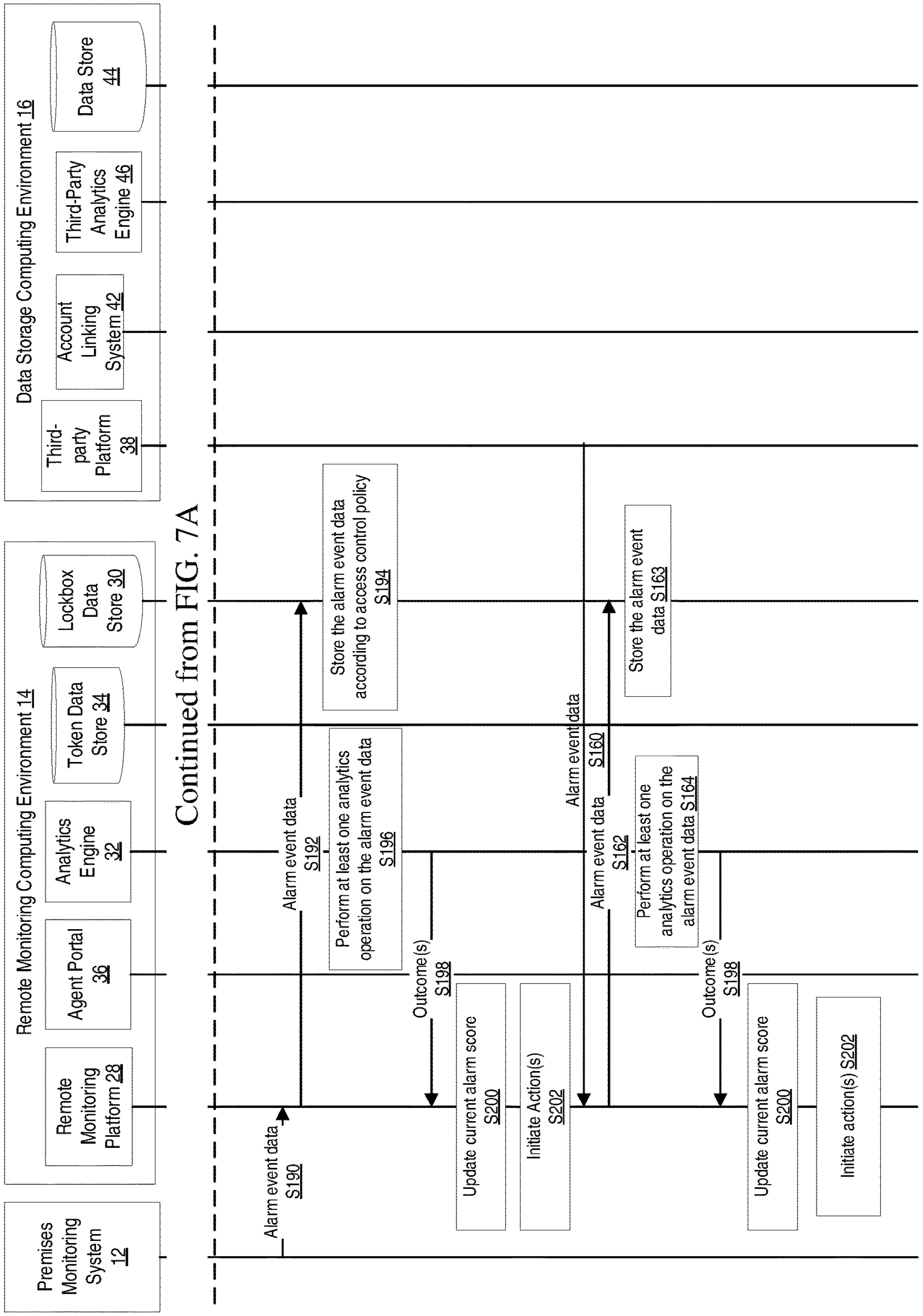

FIGS. 7A-7B are a sequence diagram of an example of functionality performed by components in the premises monitoring system 12, remote monitoring computing environment 14 and data storage computing environment 16 of FIG. 1 according to various embodiments of the present disclosure. When premises monitoring system 12 is in an "armed" state (Block S178), a premises device 20 (e.g., door/window sensor) at a premises is triggered. Monitoring control device 22 transmits an alarm signal to remote monitoring computing environment 14 (Block S180). The alarm event may be automatically assigned an alarm score of level or value "1" as this may be the default level for a new alarm event (Block S182).

Remote monitoring computing environment 14 attempts to contact a designated user (or users) via a phone call, SMS message, and/or chat through a mobile software application associated with premises monitoring system 12 (Block S184). In this example, there is no response, so the alarm level remains "1." If an authorized user had responded, been authenticated, and indicated that there was a false alarm, the alarm level would have been de-escalated to "0," and the alarm event would have been terminated (Block S186).

If the alarm event has not been terminated, remote monitoring platform 28 monitors for alarm event data associated with the alarm event (Block S188). In one or more embodiments, alarm event data may comprise one or more of various content, various data, and/or indications, as described herein. In one or more embodiments, the various data of the alarm event data may comprise one or more of: data that represents a user's history of alarm events, weather data, and/or other data associated with the premises monitoring system 12.

While the alarm event is active (i.e., alarm event has not been terminated), remote monitoring computing environment 14 may receive alarm event data from various sources at varying times during the alarm event. For example, premises monitoring system 12 may transmit alarm event data associated with the alarm event to remote monitoring platform 28 (Block S190). Remote monitoring platform 28 transmits the alarm event data to lockbox data store 30 for storage of the alarm event data associated with the alarm event according to the access control policy (Blocks S192-S194). Analytics engine 32 is configured to retrieve the alarm event data associated with the alarm event and perform at least one analytics operation on the alarm event data (Block S196). The at least one analytics operation may comprise one or more of objection detection (e.g., weapon detection), people detection, natural language processing, audio analysis, analytics of sensor data, etc.

Analytics engine 32 transmits the outcome(s) of the at least one analytic operation to remote monitoring platform 28 (Block S198). Remote monitoring platform 28 updates the current alarm score associated with the alarm event based on the received outcome(s)(Block S200). Some examples of updating the current alarm score or value of the current alarm score comprise adding or increasing the value, subtracting or reducing the value and keeping the value of the current alarm score the same.

Further, alarm event data (e.g., third-party alarm event data) may be received from data storage computing environment 16, as described with respect to FIG. 4B (Block S160). For example, in one or more embodiments, alarm event data may be received from the data storage computing environment 16 while the alarm is active. Remote monitoring platform 28 transmits the alarm event data to lockbox data store 30, as described with respect to FIG. 4B (Block S162). Lockbox data store 30 stores the alarm event data associated with the alarm event according to the access control policy, as described with respect to FIG. 4B (Block S163). Analytics engine 32 performs at least one analytic operation on the alarm event data (e.g., at least the third-party alarm event data) associated with the alarm event, as also described with respect to FIG. 4B (Block S164). Analytics engine 32 transmits the outcome(s) of the at least one analytics operation to remote monitoring platform 28 (Block S198), updates the current alarm score (Block S200) and initiates one or more actions (Block S202).

In one or more embodiments, while the alarm is active, alarm event data may be received from premises monitoring system 12 and/or data storage computing environment 16 in any temporal order or at the same time. In one or more embodiments, alarm event data may be received from agent portal 36 and/or other data sources, where such alarm event data is treated as described in Blocks S192-S202. Further, while at least one analytics operation may be performed in response to alarm event data received by remote monitoring computing environment 14, in one or more embodiments, the at least one analytics operation may be initiated based on a predefined timer (i.e., upon expiration of a timer) and/or based on a command from agent portal such that an agent may use the most update-to-date alarm score before initiating an agent action.

Some examples of the process performed in FIG. 7B will now be described. Remote monitoring platform 28 receives video from a camera (premises device 20) located at the premises. The video is stored in the lockbox data store 30 and input to the analytics engine 32. The analytics engine 32 performs one or more analytics operation(s) on the video or uses the video as an input, such as attempting to determine whether various objects and/or activities are depicted in the video. In this example, analytics engine 32 determines that a person is depicted in the video, e.g., outcome of at least one analytic operation, which corresponds to an alarm level in, for example, AVS-01 that is higher than the current alarm level. Accordingly, the alarm score is escalated to "2."

Remote monitoring computing environment 14 continues to receive alarm event data from various premises devices 20 at the premises and stores the alarm event data in lockbox data store 30. In this example, additional video is received, and analytics engine 32 determines that the video depicts a person swinging a hammer and breaking objects in the home, which corresponds to an alarm level in, for example, AVS-01 that is higher than the current alarm level. Accordingly, the alarm level is escalated to "3."

Remote monitoring computing environment 14 continues to receive alarm event data from various premises devices 20 at the premises and stores the alarm event data in lockbox data store 30. In this example, audio alarm event data is received, and analytics engine 32 determines that it includes audio of at least two people yelling and one of the people stating, "I'm going to harm you," which corresponds to an alarm level in, for example, AVS-01 that is higher than the current alarm level Accordingly, the alarm level is escalated to "4."

Further, remote monitoring computing environment 14 may receive alarm event data from an authorized user associated with premises monitoring system 12 that may be used to update the alarm score. For example, the authorized user (e.g., homeowner) may be prompted by remote monitoring computing environment 14 via a mobile application operating on the user's mobile device to answer one or more questions associated with the alarm event. Some example questions may comprise: "Did you hear a glass break?", "Did you open the front door?", "Are any authorized users at the premises?", etc.

While the alarm event is active or non-terminated, remote monitoring computing environment 14 and/or monitoring agents, via agent portal 36, can initiate at least one remote monitoring computing environment 14 actions such as, for example, providing updated alarm level information, i.e., alarm event data, to first responders. For example, remote monitoring computing environment 14 may transmit a webpage link to a first responder's electronic device where the first responders are able to view and/or stream some or all of the alarm event data associated with the alarm event. The alarm event data that is viewable by the first responders may comprise one or more of an alarm score, one or more outcomes of the at least one analytics operation, etc.

In one or more embodiments, the current alarm score may be manually modified or updated via agent portal 36 and/or via an authorized user.

In one or more embodiments, in response to remote monitoring computing environment 14 closing out the alarm event, remote monitoring platform 28 may be configured to transmit a message to data storage computing environment 16 indicating the alarm event has been closed out such that data storage computing environment 16 may stop sending notifications of newly generated alarm event data (i.e., alarm event data generated by third-party device 24) that may be associated with the alarm signal.

In one or more embodiments, the user or customer associated with premises monitoring system 12 may be able to use a client device and/or control panel to allow the customer to click links to play alarm event data generated by third-party device 24 from lockbox data store 30 after the user or customer has been authenticated. The user may authenticate oneself using a personal identification number, PIN, or code, and may be requested to perform two-factor authentication.

In one or more embodiments, a link to the lockbox data store 30 user interface (UI) is sent to data storage computing environment 16 such that the user can access the video in the lockbox data store 30.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system, comprising:
- a computing system comprising:
  - at least one data store;
  - at least one processor; and
  - at least one computer-readable medium storing a plurality of instructions that, when executed by the at least one processor, cause the at least one processor to:
    - enforce an access control policy on alarm event data in the at least one data store, the access control policy restricting access to the alarm event data in the at least one data store based on time and a plurality of roles of a plurality of users of the computing system;
    - receive an alarm signal from a premises monitoring system that is configured to monitor a premises, the alarm signal being associated with an alarm event at a premises monitored by the premises monitoring system;
    - in response to the alarm signal, set a value of a current alarm score to a default alarm value;
    - receive first alarm event data associated with the alarm event;
    - store the first alarm event data associated with the alarm event in the at least one data store of the computing system according to the access control policy;
    - perform at least one first analytics operation on the first alarm event data to detect that a human is present at the premises;
    - in response to detecting that the human is present at the premises, escalate the value of the current alarm score to a first predefined value that indicates that the human is at the premises;
    - receive second alarm event data associated with the alarm event;
    - store the second alarm event data associated with the alarm event in the at least one data store of the computing system according to the access control policy;
    - perform at least one second analytics operation on the second alarm event data to detect a threat to property;
    - in response to detecting the threat to property, escalate the value of the current alarm score to a second predefined value that indicates that a threat to property has been detected; and
    - cause the second predefined value of the current alarm score to be transmitted to a first responder system.

2. The system of claim 1, wherein the plurality of instructions are further configured to cause the at least one processor to cause the first predefined value of the current alarm score to be transmitted to the first responder system prior to causing the second predefined value of the current alarm score to be transmitted to the first responder system.

3. The system of claim 1, wherein the access control policy comprises:
- a first tier that permits a monitoring agent assigned to an alarm event to access the alarm event data for only a first period of time;
- a second tier that permits a supervisor of the monitoring agent to access the alarm event data for only a second period of time, the second period of time encompassing the first period of time and being longer than the first period of time; and
- a third tier that permits a designated administrator to access the alarm event data for only a third period of time, the third period of time encompassing the first period of time and the second period of time, the third period of time being longer than the first period of time and the second period of time.

4. The system of claim 1, wherein the plurality of instructions are further configured to cause the at least one processor to cause transmission, to a mobile device corresponding to an authorized user of the premises monitoring system, of a notification based on the second predefined value of the current alarm score.

5. A system, comprising:
- a computing system comprising:
  - at least one data store;
  - at least one processor; and
  - at least one computer-readable medium storing a plurality of instructions that, when executed by the at least one processor, cause the at least one processor to:
    - receive an alarm signal from a premises monitoring system that is configured to monitor a premises, the alarm signal being associated with an alarm event at a premises monitored by the premises monitoring system;
    - receive alarm event data associated with the alarm event;
    - store the alarm event data associated with the alarm event in the at least one data store of the computing system;
    - enforce an access control policy on the alarm event data stored in the at least one data store, the access control policy restricting access to the alarm event data based on time and a plurality of roles of a plurality of users of the computing system;
    - perform at least one analytics operation on the alarm event data associated with the alarm event;
    - update a value of a current alarm score based on an output of the at least one analytics operation; and
    - initiate at least one action based on the value of the current alarm score after the value of the current alarm score is updated.

6. The system of claim 5, wherein the alarm event data associated with the alarm event comprises at least one of video content, user-generated information, remote monitoring system information or audio content.

7. The system of claim 5, wherein the at least one action comprises causing transmission, to a first responder system, of a notification that comprises the value of the current alarm score.

8. The system of claim 5, wherein the at least one action comprises causing transmission, to a mobile device corresponding to an authorized user of the premises monitoring system, of a notification associated with the alarm event.

9. The system of claim 5, wherein the access control policy comprises:

a first tier that permits a monitoring agent assigned to an alarm event to access the alarm event data for only a first period of time;

a second tier that permits a supervisor of the monitoring agent to access the alarm event data for only a second period of time, the second period of time encompassing the first period of time and being longer than the first period of time; and a third tier that permits a designated administrator to access the alarm event data for only a third period of time, the third period of time encompassing the first period of time and the second period of time, the third period of time being longer than the first period of time and the second period of time.

10. The system of claim 5, wherein the at least one action comprises adjusting the access control policy for the alarm event data.

11. The system of claim 5, wherein the plurality of instructions are further configured to cause, in response to the alarm signal being received from the premises monitoring system, the value of the current alarm score to be to set to a default alarm value.

12. The system of claim 5, wherein the plurality of instructions are further configured to cause the at least one processor to:

determine that the output of the at least one analytics operation indicates an escalation event at the premises; and update of the value of the current alarm score by at least escalating the value of the current alarm score based on the escalation event.

13. The system of claim 12, wherein the escalation event comprises at least one of:

a person present at the premises;

a threat to property at the premises; or a threat to life at the premises.

14. The system of claim 5, wherein the plurality of instructions are further configured to cause the at least one processor to:

determine that the output of the at least one analytics operation indicates a de-escalation event at the premises; and update the value of the current alarm score by at least de-escalating the value of the current alarm score based on the de-escalation event.

15. The system of claim 14, wherein the de-escalation event comprises an authorized person being present at the premises.

16. A method implemented by a system comprising a computing system, the computing system comprising at least one data store, the method comprising:

receiving an alarm signal from a premises monitoring system that is configured to monitor a premises, the alarm signal being associated with an alarm event at a premises monitored by the premises monitoring system;

receiving alarm event data associated with the alarm event;

store the alarm event data associated with the alarm event in the at least one data store of the computing system;

enforcing an access control policy on the alarm event data stored in the at least one data store, the access control policy restricting access to the alarm event data based on time and a plurality of roles of a plurality of users of the computing system;

performing at least one analytics operation on the alarm event data associated with the alarm event;

updating a value of a current alarm score based on an output of the at least one analytics operation; and initiating at least one action based on the value of the current alarm score after the value of the current alarm score is updated.

17. The method of claim 16, wherein the alarm event data associated with the alarm event comprises at least one of video content, user-generated information, remote monitoring system information or audio content.

18. The method of claim 16, wherein the at least one action comprises at least one of:

causing transmission, to a first responder system, of a notification that comprises the value of the current alarm score;

causing transmission, to a mobile device corresponding to an authorized user of the premises monitoring system, of a notification associated with the alarm event; or adjusting the access control policy for the alarm event data.

19. The method of claim 16, wherein the access control policy comprises:

a first tier that permits a monitoring agent assigned to an alarm event to access the alarm event data for only a first period of time;

a second tier that permits a supervisor of the monitoring agent to access the alarm event data for only a second period of time, the second period of time encompassing the first period of time and being longer than the first period of time; and a third tier that permits a designated administrator to access the alarm event data for only a third period of time, the third period of time encompassing the first period of time and the second period of time, the third period of time being longer than the first period of time and the second period of time.

20. The method of claim 16, further comprising:

determining that the output of the at least one analytics operation indicates an escalation event at the premises;

updating of the value of the current alarm score by at least escalating the value of the current alarm score based on the escalation event; and the escalation event comprising at least one of:

a person present at the premises;

a threat to property at the premises; or a threat to life at the premises.

* * * * *